United States Patent
Heath et al.

(10) Patent No.: US 7,788,421 B1
(45) Date of Patent: Aug. 31, 2010

(54) DETECTABLE NULL MEMORY FOR AIRFLOW BAFFLING

(75) Inventors: Taliver B. Heath, Mountain View, CA (US); David W. Stiver, Santa Clara, CA (US); Timothe P. Hockin, San Francisco, CA (US); Duncan Laurie, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 287 days.

(21) Appl. No.: 12/019,189

(22) Filed: Jan. 24, 2008

(51) Int. Cl.
*G06F 9/02* (2006.01)
(52) U.S. Cl. .......................... 710/15; 710/17
(58) Field of Classification Search ................ 361/690, 361/695, 699, 825; 365/212, 222, 63; 710/110, 710/2, 300; 711/100, 154, 170, 5
See application file for complete search history.

(56) References Cited

U.S. PATENT DOCUMENTS

| | | | | |
|---|---|---|---|---|
| 6,092,146 A * | 7/2000 | Dell et al. | ................... | 711/5 |
| 6,357,018 B1 * | 3/2002 | Stuewe et al. | ................ | 714/37 |
| 6,483,699 B1 * | 11/2002 | Salmonson et al. | .... | 361/679.51 |
| 6,542,363 B2 * | 4/2003 | White | .................... | 361/695 |
| 6,665,736 B1 * | 12/2003 | Fan | ............................. | 710/2 |
| 6,948,020 B1 * | 9/2005 | Bonomo et al. | ............ | 710/300 |
| 6,957,289 B2 * | 10/2005 | Touchet | ................. | 710/104 |
| 7,028,213 B2 * | 4/2006 | Majni et al. | ................. | 714/5 |
| 7,079,395 B2 * | 7/2006 | Garnett et al. | ............... | 361/715 |
| 7,092,252 B2 * | 8/2006 | Robertson | .................... | 361/690 |
| 7,242,653 B2 * | 7/2007 | Mashimo et al. | ......... | 369/47.52 |
| 7,272,668 B1 * | 9/2007 | Walton et al. | ................. | 710/15 |
| 7,450,456 B2 * | 11/2008 | Jain et al. | ..................... | 365/212 |
| 7,474,528 B1 * | 1/2009 | Olesiewicz et al. | ......... | 361/695 |
| 7,631,176 B2 * | 12/2009 | Weiss et al. | ..................... | 713/1 |
| 2002/0124886 A1 * | 9/2002 | White | ................... | 137/315.16 |
| 2005/0138267 A1 * | 6/2005 | Bains et al. | ................. | 711/100 |
| 2006/0206673 A1 * | 9/2006 | Lu et al. | ...................... | 711/154 |
| 2007/0274040 A1 * | 11/2007 | Chen | .......................... | 361/695 |
| 2009/0027852 A1 * | 1/2009 | Roesner et al. | ............. | 361/690 |

OTHER PUBLICATIONS

SBS Implementers Forum, System Management Bus (SMBus) Specification, 1995, Ver. 1.0, pp. 1-40.*

* cited by examiner

*Primary Examiner*—Henry W. H. Tsai
*Assistant Examiner*—Cheng-Yuan Tseng
(74) *Attorney, Agent, or Firm*—Park, Vaughan & Fleming LLP; Jorge Campos

(57) ABSTRACT

One embodiment of the present invention provides a system for directing airflow through a computing device. This system comprises an airflow baffle, which includes a set of signal pins and a circuit. The airflow baffle is configured to direct airflow through the computing device, and the set of signal pins are configured to interface the airflow baffle with the computing device. Moreover, the circuit in the airflow baffle is coupled to the set of signal pins, and is configured to use the signal pins to notify the computing device that the airflow baffle is installed in the computing device.

18 Claims, 7 Drawing Sheets

DETECTABLE NULL MEMORY FOR AIRFLOW BAFFLING

BACKGROUND

1. Field of the Invention

The present invention relates to techniques for directing airflow for cooling purposes through a computing device. More specifically, the present invention relates to a technique for detecting the presence of installed airflow baffles in the computing device.

2. Related Art

The internal components in a computing device are often configured to facilitate airflow for cooling purposes. This airflow ideally circulates cool air across heat-producing components to control temperatures within the computing device. For example, memory modules are often organized in parallel rows to direct airflow in a predictable manner. However, memory banks that are not fully populated can create an opening that may cause unwanted bypass airflow. This bypass can prevent the airflow from reaching heat-producing components in the computing device, which can cause the components to overheat.

To solve this problem, "airflow baffles" are often used to fill empty memory slots in a computing device for the purpose of directing airflow. For example, one type of airflow baffle fits into a Dual Inline Memory Module (DIMM) slot of a computing device and is configured to direct airflow in the same manner as an actual DIMM. These airflow baffles can be installed by the manufacturer of the computing device, or by a user of the computing device. However, there is no way for a system administrator to determine from a remote location if all the airflow baffles are properly installed in a computing device.

Hence, what is needed is a method or apparatus that facilitates remotely identifying the configuration of the airflow baffles in a computing device.

SUMMARY

One embodiment of the present invention provides a system for directing airflow through a computing device. This system comprises an airflow baffle, which includes a set of signal pins and a circuit. The airflow baffle is configured to direct airflow through the computing device, and the set of signal pins are configured to interface the airflow baffle with the computing device. Moreover, the circuit in the airflow baffle is coupled to the set of signal pins, and is configured to use the signal pins to notify the computing device that the airflow baffle is installed in the computing device.

In a variation on this embodiment, the airflow baffle is configured to be mounted in place of a Dual Inline Memory Module (DIMM) in the computing device.

In a variation on this embodiment, the set of signal pins includes a first signal pin and a second signal pin. When the airflow baffle is installed in the computing device, the first signal pin is configured to interface with the SCL signal of an I2C interface on the computing device, and the second signal pin is configured to interface with the SDA signal of the I2C interface on the computing device. Furthermore, the circuit in the airflow baffle is configured to perform serial presence detect (SPD) functions to signal the presence of the airflow baffle during a boot sequence of the computing device. To achieve this goal, the set of signal pins are coupled to corresponding I2C pins of a DIMM interface in the computing device when the airflow baffle is installed in the computing device.

In a variation on this embodiment, if the airflow baffle is installed in the computing device, the SPD function signals the presence of the airflow baffle during a boot sequence by responding to a request to an SPD byte with an UNDEFINED value.

In a variation on this embodiment, the airflow baffle is configured to be mounted over a microprocessor, a disk drive, or another component in the computing device to direct airflow across a targeted component in the computing device.

In a variation on this embodiment, the set of signal pins includes a first signal pin and a second signal pin, and the circuit in the airflow baffle couples the first signal pin to the second signal pin. Moreover, when the airflow baffle is installed in the computing device, the first signal pin is configured to interface with a grounded pin, and the second signal pin is configured to interface with a sense pin that is coupled to a general-purpose input/output (GPIO) port on the computing device.

In a variation on this embodiment, the sense pin on the computing device is coupled to a resistive pull-up network. In this way, if the airflow baffle is installed in the computing device, a connection is established between ground on the first signal pin and the second signal pin. This causes a logical zero value to appear on the GPIO port of the computing device. Otherwise, if the airflow baffle is not installed in the computing device, no connection is established, which causes a logical one value to appear on the GPIO port of the computing device.

In a variation on this embodiment, the set of signal pins includes a first signal pin and a second signal pin, and the circuit in the airflow baffle couples the first signal pin to the second signal pin. Moreover, when the airflow baffle is installed in the computing device, the first signal pin is configured to interface with a voltage source, and the second pin is configured to interface with a sense pin that is coupled to a GPIO port on the computing device.

In a variation on this embodiment, the sense pin on the computing device is coupled to a resistive pull-down network. In this way, if the airflow baffle is installed in the computing device, a connection is established between the voltage source on the first signal pin and the second signal pin. This causes a logical one value to appear on the GPIO port of the computing device. Otherwise, if the airflow baffle is not installed in the computing device, no connection is established, which causes a logical zero value to appear on the GPIO port of the computing device.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Figure 1:
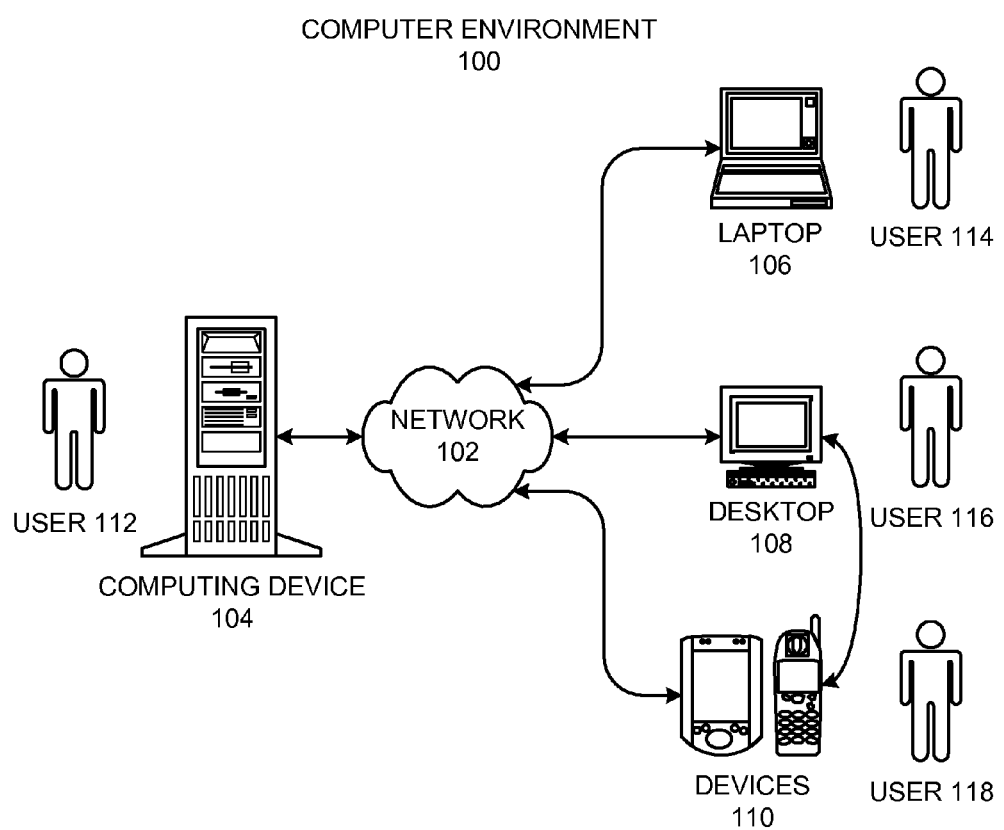
FIG. 1 illustrates a computing environment in accordance with an embodiment of the present invention.

FIG. 1 illustrates a computing environment 100 in accordance with an embodiment of the present invention. Computing environment 100 includes a number of computing devices, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes network 102, computing device 104, laptop 106, desktop 108, and devices 110.

Network 102 can include any type of wired or wireless communication channel capable of coupling together computing nodes 104-110. This includes, but is not limited to, a local area network, a wide area network, or a combination of networks. In one embodiment of the present invention, network 102 includes the Internet. In some embodiments of the present invention, network 102 includes telephone and cellular telephone networks.

Computing nodes 104-108 can include any node on a network including computational capability and including a mechanism for communicating across network 102.

Devices 110 can include any type of electronic device that can be coupled to a computing node, such as desktop 108, or to a network, such as network 102, to interact with computing device 104. These devices include, but are not limited to, a mobile telephone, or a personal digital assistant (PDA).

Users 112-118 can include: an individual; a group of individuals; an organization; a group of organizations; a computing system; a group of computing systems; or any other entity that can interact with computing device 104.

Note that different embodiments of the present invention may use different configurations, and are not limited to the configurations illustrated in computing environment 100. In some embodiments of the present invention, the interaction with computing device 104 can be performed through a web service on computing device 104, while in other embodiments of the present invention, the interaction with computing device 104 can be performed through an application executing on computing nodes 106-110. Also note the users 112-118 may interact with computing device 104 via various devices, such as via laptop 106, desktop 108, devices 110, or directly via computing device 104.

Figure 2:
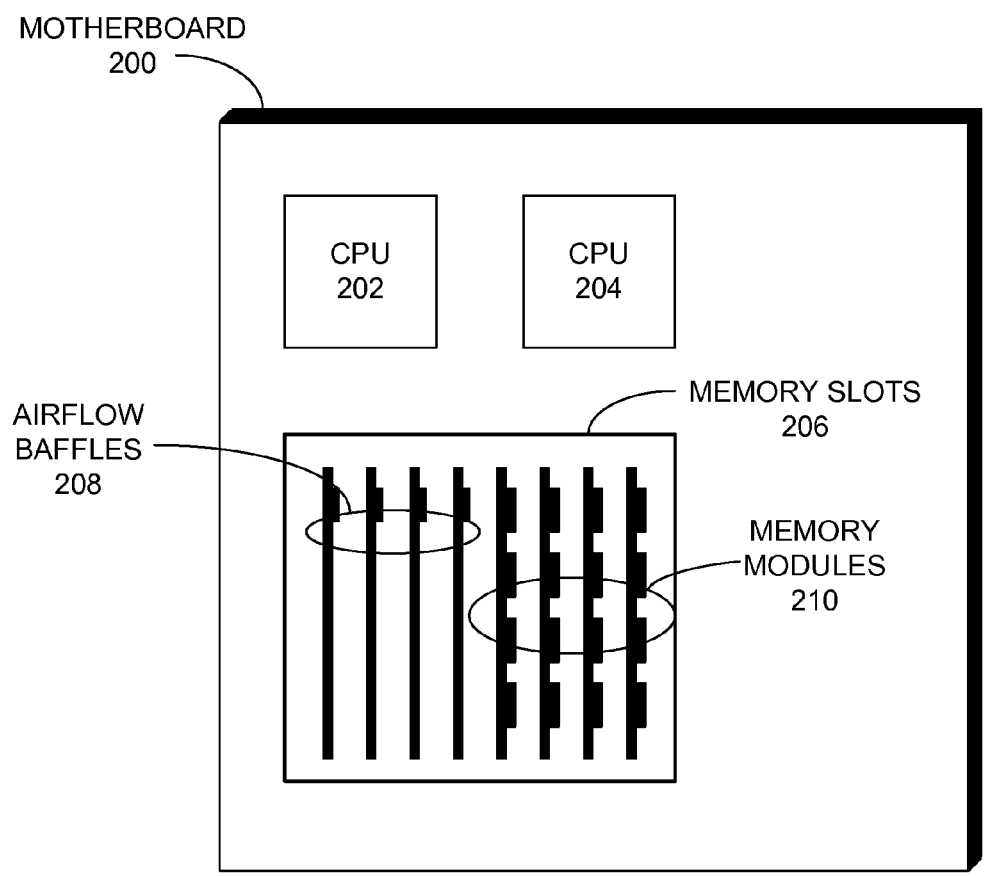
FIG. 2 illustrates a motherboard for a computing device in accordance with an embodiment of the present invention.

FIG. 2 illustrates a motherboard 200 for a computing device 104 in accordance with an embodiment of the present invention. Motherboard 200 includes one or more microprocessors 202-204, one or more memory slots 206, and can include other components not depicted in FIG. 2. In one possible configuration, the memory slots are oriented to guide air towards one or more components of the motherboard, such as microprocessors 202-204. In the configuration of FIG. 2, only the last four memory slots contain memory modules 210, which direct airflow towards CPU 204. Additionally, airflow baffles 208 are placed in the four unused memory slots to direct airflow towards CPU 202. Note that airflow baffles 208 are not placed in the unused memory slots, an airflow eddy can form over the empty memory slots, which can reduce the airflow to CPU 202. A reduced airflow can cause CPU 202 to overheat, and can eventually cause CPU 202 to fail.

Figure 3A:
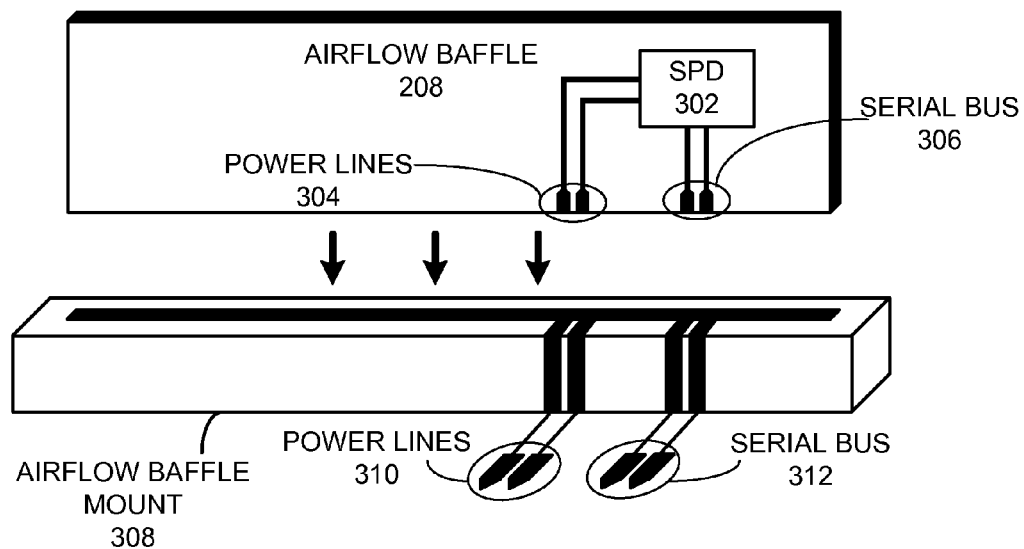
FIG. 3A illustrates an airflow baffle configured to interface with a serial bus in accordance with an embodiment of the present invention.

FIG. 3A illustrates an airflow baffle 208 configured to interface with a serial bus 312 in accordance with an embodiment of the present invention. In this embodiment, airflow baffle 208 contains a serial presence detect (SPD) device 302 coupled to serial bus 306 and power lines 304. When airflow baffle 208 is installed on motherboard 200, the SPD device 302 of airflow baffle 208 is coupled to motherboard 200 through serial bus 306, and through power lines 304. Note that motherboard 200 provides power and ground to the SPD device through power lines 310.

In one variation of this embodiment, serial bus 306 is an I2C serial interface. In this variation, the system uses the I2C serial interface to determine whether a respective slot in memory slots 206 is empty, and whether the memory slot is occupied by a memory module 210. Note that the I2C interface is typically used by motherboard 200 to identify the memory modules 210 that are installed in memory slots 206, and to attain information about memory modules 210.

During the detection process, motherboard 200 sends a request for a respective SPD byte over the I2C serial interface to a module in a slot in memory slots 206, and the module responds with a respective value. For example, airflow baffle 208 can use the I2C interface to respond to a request for an SPD byte with an UNDEFINED value. By providing a response to a request for an SPD byte, airflow baffle 208 can notify motherboard 200 that the respective memory slot is not empty. Moreover, by responding to the request with an UNDEFINED value, airflow baffle 208 notifies motherboard 200 that airflow baffle 208 is not a memory module 210.

Figure 3B:
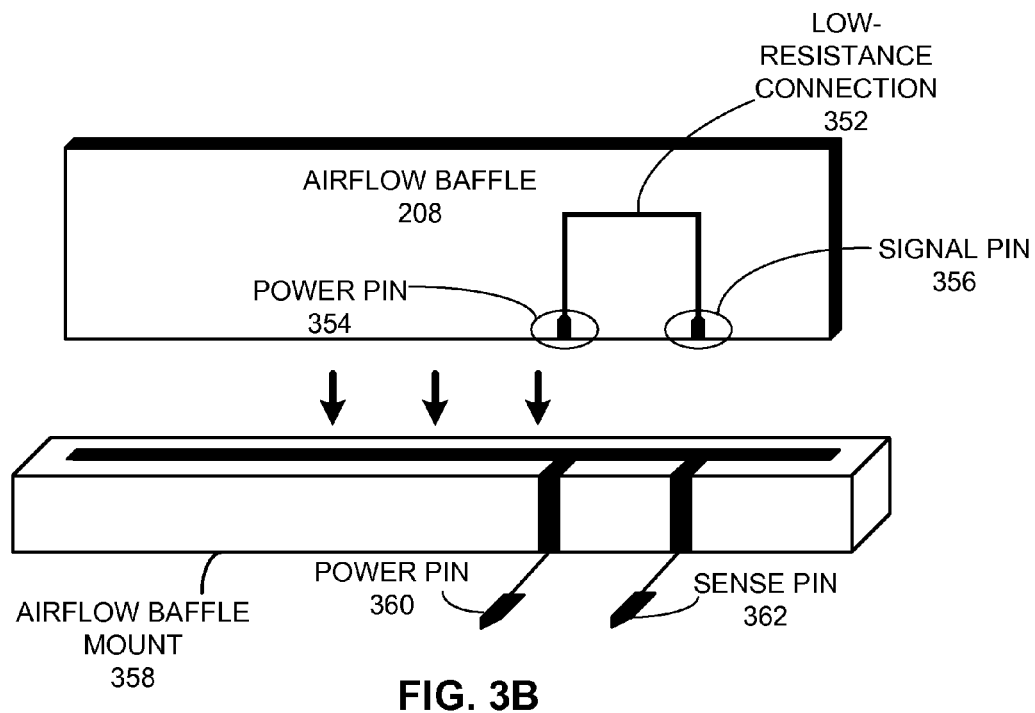
FIG. 3B illustrates an airflow baffle configured to interface with a sense pin in accordance with an embodiment of the present invention.

FIG. 3B illustrates an airflow baffle 208 configured to interface with a sense pin 362 in accordance with an embodiment of the present invention. Note that airflow baffle 208 contains a low-resistance connection 352, which couples power pin 354 with signal pin 356. Moreover, airflow baffle 208 is installed on motherboard 200 by coupling airflow baffle 208 to airflow baffle mount 358. When airflow baffle 208 is installed on motherboard 200, power pin 360 is coupled to sense pin 362 through low-resistance connection 352 in airflow baffle 208.

By monitoring signal pin 356 on airflow baffle 356, the system can determine whether airflow baffle 208 is installed. Note that sense pin 362 on motherboard 200 provides a default logical value when airflow baffle 208 is not installed on motherboard 200. Moreover, sense pin 362 can be coupled to computing device 104 through a general-purpose input/output (GPIO) pin, or any other pin that allows computing device 104 to determine if airflow baffle 208 is installed. When airflow baffle 208 is installed in motherboard 200, signal pin 356 on airflow baffle 208 is coupled to sense pin 362 of motherboard 200. This creates a low-resistance path to power pin 360 which forces sense pin 362 to have a logical value different than the default logical value.

Figure 4A:
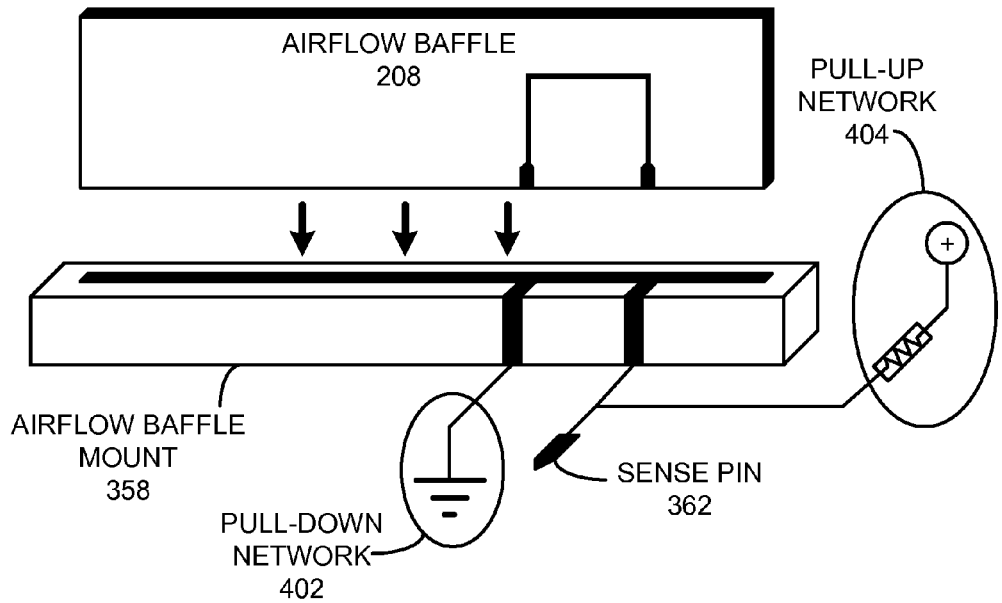
FIG. 4A illustrates an airflow baffle coupled to an airflow baffle mount in accordance with an embodiment of the present invention.

FIG. 4A illustrates airflow baffle 208 of FIG. 3B being coupled to airflow baffle mount 358 to interact with electrical networks 402-404 in accordance with an embodiment of the present invention. In this embodiment, sense pin 362 on motherboard 200 is coupled to pull-up network 404, which causes sense pin 362 to provide a logical one value when airflow baffle 208 is not installed on motherboard 200. When airflow baffle 208 is installed in motherboard 200, signal pin 356 on airflow baffle 208 is coupled to sense pin 362 of motherboard 200, and power pin 354 on airflow baffle 208 is coupled to pull-down network 402 on motherboard 200. Therefore, sense pin 362 is coupled to pull-down network 402 through low-resistance connection 352 when airflow baffle 208 is installed on motherboard 200. Note that pull-down network 402 is designed to have a stronger pull than pull-up network 404, which forces sense pin 362 to provide a logical zero value when airflow baffle 208 is installed on motherboard 200.

Figure 4B:
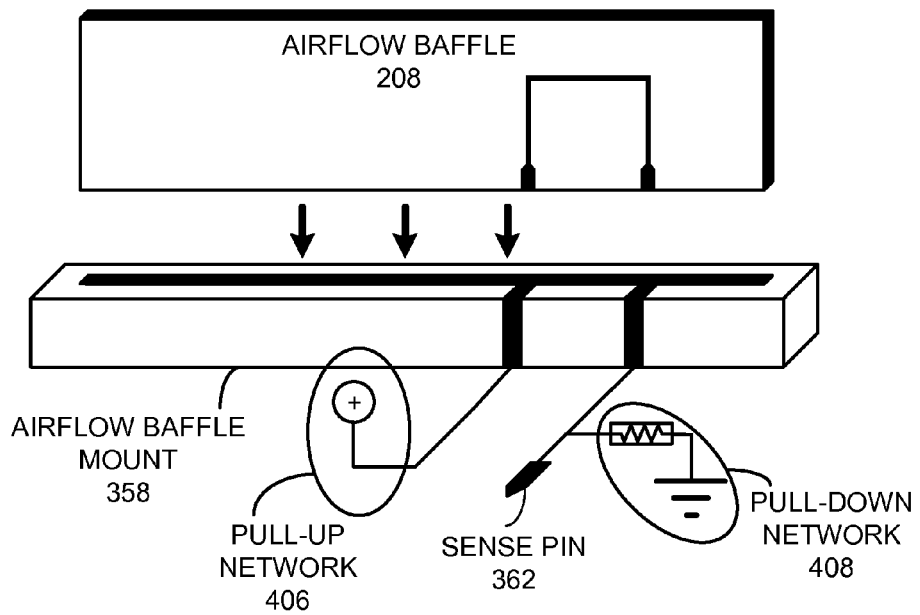
FIG. 4B illustrates an airflow baffle coupled to an airflow baffle mount in accordance with an embodiment of the present invention.

FIG. 4B illustrates airflow baffle 208 of FIG. 3B being coupled to airflow baffle mount 358 to interact with electrical networks 406-408 in accordance with an embodiment of the present invention. In this embodiment, sense pin 362 on motherboard 200 is coupled to pull-down network 408, which causes sense pin 362 to provide a logical zero value when airflow baffle 208 is not installed on motherboard 200. When airflow baffle 208 is installed in motherboard 200, signal pin 356 on airflow baffle 208 is coupled to sense pin 362 of motherboard 200, and power pin 354 on airflow baffle 208 is coupled to pull-up network 406 on motherboard 200. Therefore, sense pin 362 is coupled to pull-up network 406 through low-resistance connection 352 when airflow baffle 208 is installed on motherboard 200. Note that pull-up network 406 is designed to have a stronger pull than pull-down network 408, which forces sense pin 362 to provide a logical one value when airflow baffle 208 is installed on motherboard 200.

Figure 5:
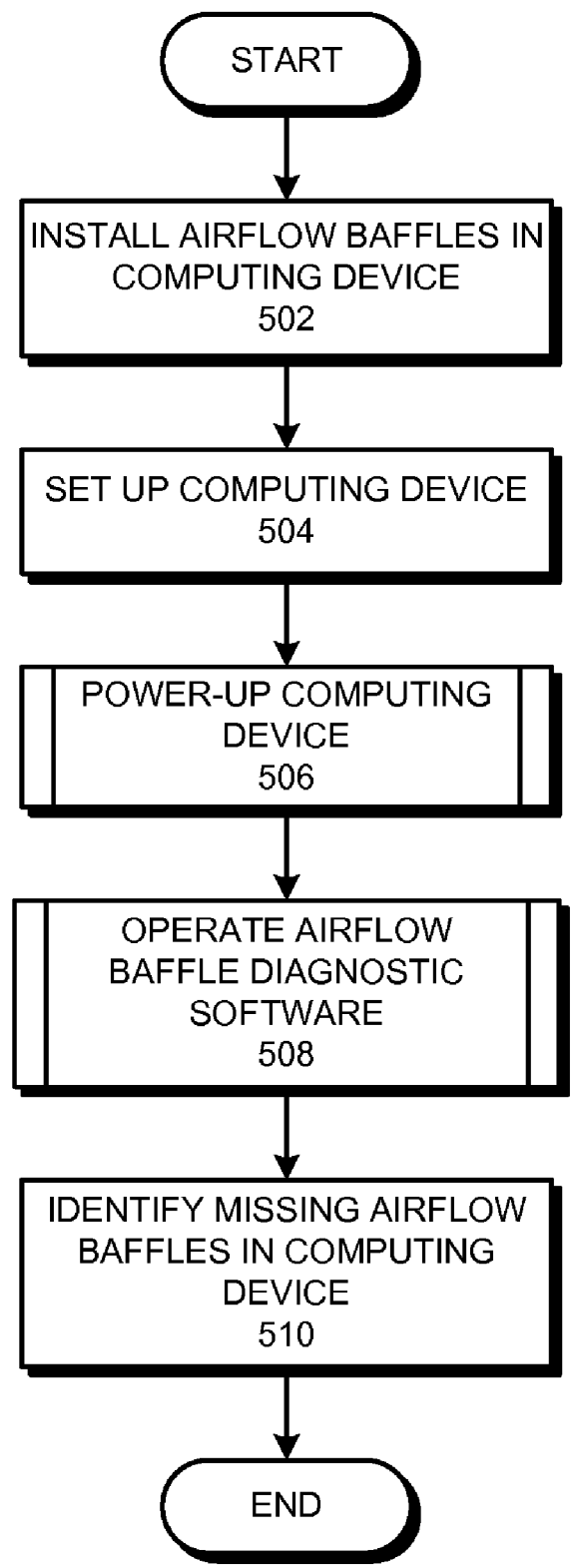
FIG. 5 presents a flowchart illustrating how a user can install airflow baffles in a computing device and validate the installation in accordance with an embodiment of the present invention.

FIG. 5 presents a flowchart illustrating how a user can install airflow baffles in a computing device and validate the installation in accordance with an embodiment of the present invention. The installation process begins with the user installing the one or more airflow baffles in computing device 104 (step 502). Note that the installation of airflow baffle 208 into computing device 104 can be performed by a manufacturer of computing device 104, a consumer of computing device 104, an end-user of computing device 104, or any other person affiliated with computing device 104.

Once the internal components of computing device 104 are configured, the user sets up the computing device (step 504). This involves coupling computing device 104 to a power source, and can include coupling the computing device 104 to a monitor, a keyboard, a mouse, a computer network, or to any other peripheral device or connection that is useful to the user.

Next, the user powers up computing device 104 (step 506), which initiates the boot sequence. In one embodiment of the present invention, the boot sequence performs diagnostic operations on computing device 104 to identify any missing airflow baffles. For an airflow baffle 208 which is configured to interface with a serial bus 312 (FIG. 3A), the diagnostic operations determine that the airflow baffle 208 is missing from a respective airflow baffle mount 308 by noticing that the serial bus 312 for the airflow baffle mount 308 does not provide a response to a request for an SPD byte. For an airflow baffle 208 which is configured to interface with a sense pin 362 (FIG. 3B), the diagnostic operations determine that an airflow baffle 208 is missing from a respective airflow baffle mount 358 by noticing that a sense pin 362 for the airflow baffle mount 358 does not hold a logic value that is consistent with an installed airflow baffle 208.

At any point during normal operation of computing device 104, the user can operate the airflow baffle diagnostic software for computing device 104 (step 508). For example, the user can operate the airflow baffle diagnostic software on computing device 104 as an initial diagnostic check of computing device 104, as a routine diagnostic check of computing device 104, or when computing device 104 is overheating. In one embodiment, the user can operate the diagnostic software on computing device 104 through an input device attached to computing device 104, such as a keyboard, or a mouse. In another embodiment, the user can operate the diagnostic software on computing device 104 over network 102 through a remote computing device, such as laptop 106, desktop 108, or devices 110.

In one embodiment of the present invention, the diagnostic software for computing device 104 identifies any missing airflow baffles 208 by retrieving the diagnostic results that are generated during the boot sequence of computing device 104 (from diagnostic results generated in step 506).

In another embodiment of the present invention, the diagnostic software for computing device 104 identifies any missing airflow baffles by searching for empty slots in memory slots 206, and by probing a plurality of airflow baffle mounts 308 and 358. Note that memory slots 206 can be implemented to function as airflow baffle mount 308 does or can be implemented to function as airflow baffle mount 358 does. For example, if an airflow baffle 208 is configured to interface with a serial bus 312 through a respective airflow baffle mount 308 (FIG. 3A), the diagnostic software determines that the airflow baffle 208 is missing from the respective airflow baffle mount 308 by noticing that the serial bus 312 for the airflow baffle mount 308 does not provide a response to a request for an SPD byte. For an airflow baffle 208 which is configured to interface with a sense pin 362 through a respective airflow baffle mount 358 (FIG. 3B), the diagnostic software determines that an airflow baffle 208 is missing from the respective airflow baffle mount 358 by noticing that sense pin 362 for airflow baffle mount 358 does not hold a logic value that is consistent with an installed airflow baffle 208.

The user can then identify missing airflow baffles in computing device 104 (step 510) by analyzing the results of the diagnostic software for computing device 104.

Figure 6:
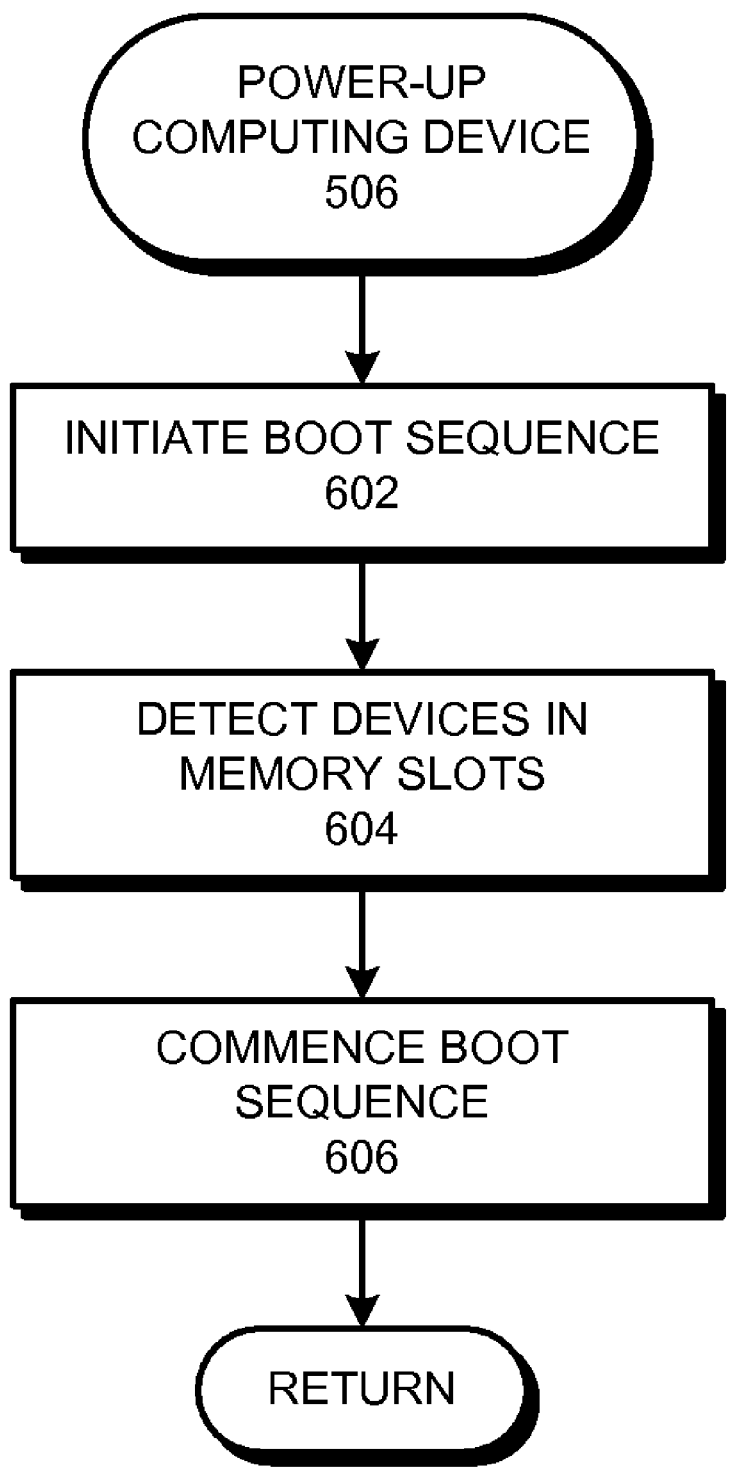
FIG. 6 presents a flowchart illustrating a boot sequence of a computing device in accordance with an embodiment of the present invention.

FIG. 6 presents a flowchart illustrating the steps involved in powering-up computing device 104 in accordance with an embodiment of the present invention (step 506). Computing device 104 begins by initiating a boot sequence (step 602), which includes forcing the internal electronics and components of computing device 104 into an initial reset state, and performing other operations that initiate the operation of these internal electronics and components.

During the boot sequence, computing device 104 performs a probe to detect devices on memory slots 206 (step 604). During this probe, computing device 104 uses serial bus 312 to identify the memory modules 210 that are installed, and to collect various parameters from memory modules 210. Note that memory modules typically use a serial presence detect (SPD) device that is coupled to a serial bus to provide the computing device with information about the memory module type and various other parameters. Moreover, airflow baffle 208 (FIG. 3A) uses SPD device 302 coupled to serial bus 306 to respond to a request for an SPD byte from computing device 104 with UNDEFINED values. In doing so, airflow baffle 208 informs computing device 104 that the respective memory slot is not empty, and that the module in the respective memory slot is not a valid memory module.

After computing device 104 determines the status of memory slots 206, computing device 104 commences the boot sequence (step 606) to prepare computing device 104 for normal operation.

Figure 7:
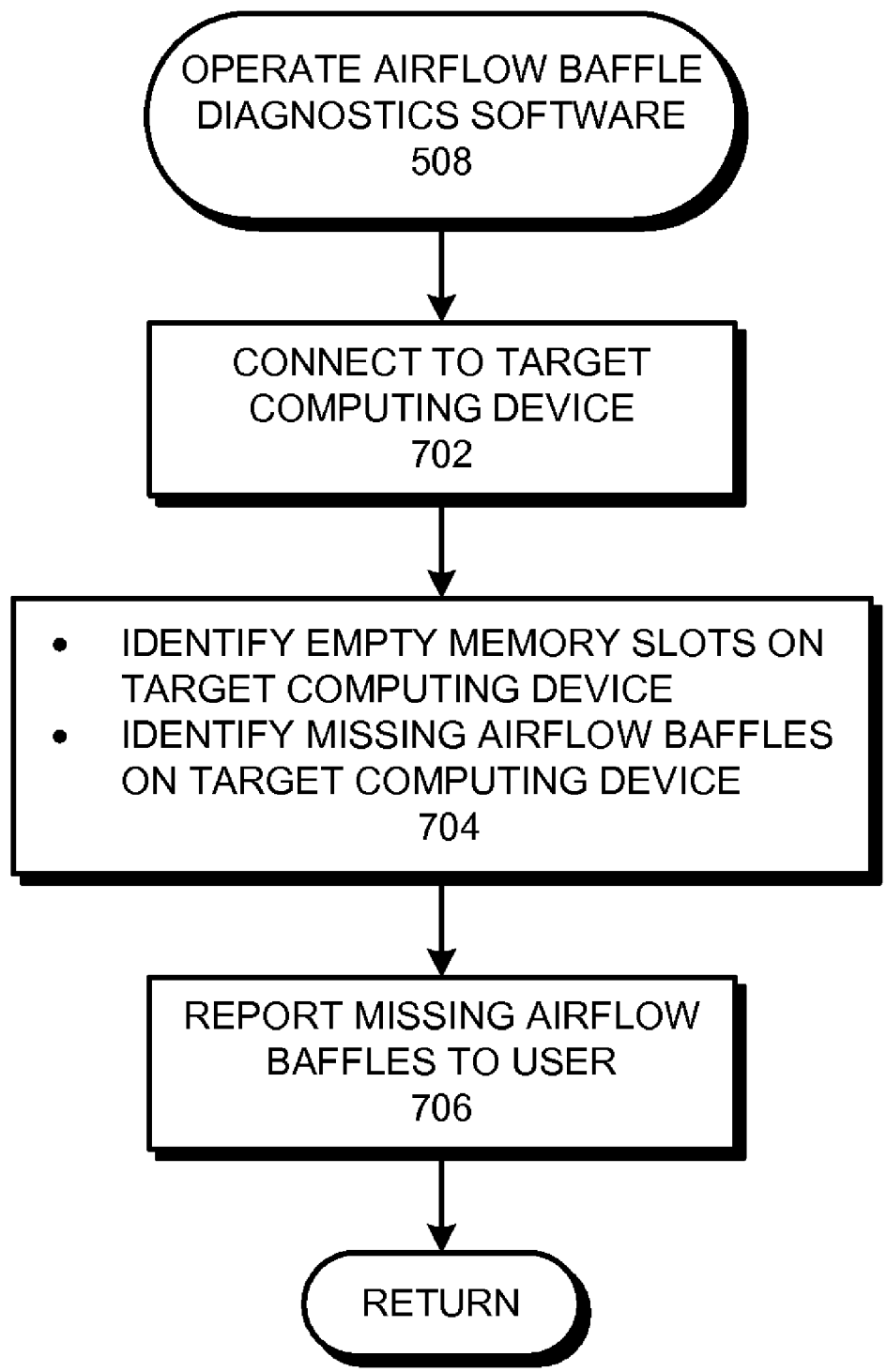
FIG. 7 presents a flowchart illustrating the operation of airflow baffle diagnostics software in accordance with an embodiment of the present invention.

FIG. 7 presents a flowchart illustrating the operation of airflow baffle diagnostic software (step 508) in accordance with an embodiment of the present invention. The airflow baffle diagnostic software begins by connecting to the target computing device 104 (step 702). In variation of this embodiment, user 112 operates the airflow baffle diagnostic software on the target computer. In another variation of this embodiment, user 114-118 operates the airflow baffle diagnostic software from a remote computing device.

During operation of the airflow baffle diagnostic software, the diagnostic software identifies any empty memory slots on the target device, and identifies any missing airflow baffles on the target computing device (step 704).

After the airflow baffle diagnostic software has analyzed the target computing device, the airflow baffle diagnostic software reports any missing airflow baffles to the user (step 706).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

The invention claimed is:

1. An apparatus for directing airflow through a computing device, comprising:
   an airflow baffle configured to direct airflow through the computing device;
   a first signal pin and a second signal pin on the airflow baffle which interface the airflow baffle with the computing device when the airflow baffle is installed in place of a Dual Inline Memory Module (DIMM) within the computing device, wherein the first signal pin interfaces with a SCL signal of an I2C interface on the computing device, and wherein the second signal pin interfaces with a SDA signal of an I2C interface on the computing device; and
   a first circuit in the airflow baffle coupled to the first signal pin and the second signal pin, wherein the circuit performs serial presence detect (SPD) functions and responds to a request to an SPD byte with a value via the first signal pin and the second signal pin during a boot sequence of the computing device to notify the computing device that the airflow baffle is installed in the computing device.

2. The apparatus of claim 1, wherein the value comprises an UNDEFINED value.

3. A computing device which detects the presence of an airflow baffle, comprising:
   a mounting mechanism configured to couple the airflow baffle to the computing device;
   a first sense pin and a second sense pin in the computing device which interface circuitry in the airflow baffle to circuitry in the computing device when the airflow baffle is installed in place of a Dual Inline Memory Module (DIMM) on the mounting mechanism within the computing device, wherein the first sense pin interfaces with a SCL signal of an I2C interface on the airflow baffle, and wherein the second sense pin interfaces with a SDA signal of an I2C interface on the airflow baffle; and
   a sense circuit coupled to the first sense pin and the second sense pin which detects the presence of the airflow baffle, wherein the circuitry in the airflow baffle performs serial presence detect (SPD) functions and responds to a request to an SPD byte with a value via the first sense pin and the second sense pin during a boot sequence of the computing device to notify the computing device that the airflow baffle is mounted in the mounting mechanism.

4. The computing device of claim 3, wherein the value comprises an UNDEFINED value.

5. A computer system which detects the presence of an airflow baffle, comprising:
   a processor;
   a memory system;
   a fan configured to direct airflow through the computer system;
   a mounting mechanism configured to couple the airflow baffle to the computer system;
   a first sense pin and a second sense pin in the computer system which interface circuitry in the airflow baffle to circuitry in the computer system when the airflow baffle is installed in place of a Dual Inline Memory Module (DIMM) on the mounting mechanism within the computing device, wherein the first sense pin interfaces with a SCL signal of an I2C interface on the airflow baffle, and wherein the second sense pin interfaces with a SDA signal of an I2C interface on the airflow baffle; and
   a sense circuit coupled to the first sense pin and the second sense pin which detects the presence of the airflow baffle, wherein the circuitry in the airflow baffle performs serial presence detect (SPD) functions and responds to a request to an SPD byte with a value via the first sense pin and the second sense pin during a boot sequence of the computing device to notify the computing device that the airflow baffle is mounted in the mounting mechanism.

6. The computer system of claim 5, wherein the value comprises an UNDEFINED value.

7. The apparatus of claim 1, further comprising:
   a third signal pin and a fourth signal pin on the airflow baffle which interface the airflow baffle with the computing device, wherein the third signal pin interfaces with a power pin consisting of a voltage source or a ground in the computing device, and wherein the fourth signal pin interfaces with a sense pin on the computing device coupled to a GPIO port and one of a pull-up resistive or a pull-down resistive network on the computing device; thereby a connection is established across the power pin, the third signal pin, the fourth signal pin, the one of pull-up or pull-down resistive network and the GPIO port only when the airflow baffle is installed; and
   a second circuit in the airflow baffle that couples the third signal pin to the fourth signal pin on the airflow baffle, wherein the second circuit notifies the computing device that the airflow baffle is installed in the computing device during the boot sequence of the computing device by providing a logic value, via the connection from the power pin of the computing device to the sense pin of the computing device, which indicates the presence of the airflow baffle.

8. The apparatus of claim 7, further comprising a diagnostic software.

9. The apparatus of claim 7, wherein the connection causes a logical zero value to appear on the GPIO port of the computing device, and otherwise, no connection is established, which causes a logical one value to appear on the GPIO port of the computing device.

10. The apparatus of claim 7, wherein the connection causes a logical one value to appear on the GPIO port of the computing device, and otherwise, no connection is established, which causes a logical zero value to appear on the GPIO port of the computing device.

11. The computing device of claim 3, further comprising:
a third signal pin and a fourth signal pin on the airflow baffle which interface the airflow baffle with the computing device, wherein the third signal pin interfaces with a power pin consisting of a voltage source or a ground in the computing device, and wherein the fourth signal pin interfaces with a sense pin on the computing device coupled to a GPIO port and one of a pull-up resistive or a pull-down resistive network on the computing device; thereby a connection is established across the power pin, the third signal pin, the fourth signal pin, the one of pull-up or pull-down resistive network and the GPIO port only when the airflow baffle is installed; and
a second circuit in the airflow baffle that couples the third signal pin to the fourth signal pin on the airflow baffle, wherein the second circuit notifies the computing device that the airflow baffle is installed in the computing device during the boot sequence of the computing device by providing a logic value, via the connection from the power pin of the computing device to the sense pin of the computing device, which indicates the presence of the airflow baffle.

12. The computing device of claim 11, further comprising a diagnostic software.

13. The computing device of claim 11, wherein the connection causes a logical zero value to appear on the GPIO port of the computing device, and otherwise, no connection is established, which causes a logical one value to appear on the GPIO port of the computing device.

14. The computing device of claim 11, wherein the connection causes a logical one value to appear on the GPIO port of the computing device, and otherwise, no connection is established, which causes a logical zero value to appear on the GPIO port of the computing device.

15. The computer system of claim 5, further comprising:
a third signal pin and a fourth signal pin on the airflow baffle which interface the airflow baffle with the computing device, wherein the third signal pin interfaces with a power pin consisting of a voltage source or a ground in the computing device, and wherein the fourth signal pin interfaces with a sense pin on the computing device coupled to a GPIO port and one of a pull-up resistive or a pull-down resistive network on the computing device; thereby a connection is established across the power pin, the third signal pin, the fourth signal pin, the one of pull-up or pull-down resistive network and the GPIO port only when the airflow baffle is installed; and
a second circuit in the airflow baffle that couples the third signal pin to the fourth signal pin on the airflow baffle, wherein the second circuit notifies the computing device that the airflow baffle is installed in the computing device during the boot sequence of the computing device by providing a logic value, via the connection from the power pin of the computing device to the sense pin of the computing device, which indicates the presence of the airflow baffle.

16. The computer system of claim 15, further comprising a diagnostic software.

17. The computer system of claim 15, wherein the connection causes a logical zero value to appear on the GPIO port of the computer system, and otherwise, no connection is established, which causes a logical one value to appear on the GPIO port of the computer system.

18. The computer system of claim 15, wherein the connection causes a logical one value to appear on the GPIO port of the computer system, and otherwise, no connection is established, which causes a logical zero value to appear on the GPIO port of the computer system.

* * * * *